2,971,949

FLUORINATED POLYMERIC PEROXIDES

John Lynde Anderson, Orlando, Fla., and Robert Ervin Putnam, Wilmington, Del., assignors to E. I. du Pont de Nemours and Company, Wilmington, Del., a corporation of Delaware No Drawing. Filed Aug. 14, 1958, Ser. No. 755,112

10 Claims. (Cl. 260—92.1)

This application, a continuation-in-part of our copending application Serial Number 592,727, filed June 21, 1956, relates to new polymeric materials, more particularly to new fluorinated polymers containing peroxide groups.

Polymers which contain fluorine have achieved commercial importance in recent years because of unusual thermal stability and chemical inertness. The known polymers contain principally carbon and fluorine and may contain another halogen, for example, chlorine. These products are homopolymers or copolymers of fluoroolefins and, as homopolymers or copolymers, are substantially oxygen-free. Oxygen, if found in such homopolymers or copolymers, is present in very small quantities and is advantitious in nature, that is, the oxygen is introduced as an impurity in the polymer in the process of its preparation. The quantity of oxygen present in the homopolymer or copolymer is too small to affect significantly the properties of the homopolymers or copolymers. Very little is known of the properties and characteristics of copolymers of fluoroolefins and oxygen in which the copolymers contain substantial quantities of oxygen in the form of peroxide groupings.

A few fluorine-free polymers containing peroxide groups are known, for example, polymeric peroxidation products of conjugated dienes, such as isoprene or chloroprene. However, these hitherto known polymers are either low molecular weight liquid products or they are resinous products which are not stable at temperatures above 0° C. Furthermore, the methods of making the hitherto known peroxide-containing polymers are not completely satisfactory since they require excessively long reaction times.

It is a general object of the present invention to provide novel fluorinated polymers containing peroxide groups. A further object is to provide novel fluorinated polymers containing peroxide groups suitable for use as explosives and fuels, e.g., rocket propellants. Still another object is to provide a process for preparing such polymers in a short time. Other objects will be apparent hereinafter.

The aforesaid objects are achieved in accordance with the present invention by copolymers of oxygen with 1,1,4,4-tetrafluoro-1,3-butadienes having at least one hydrogen bonded to the 2 and 3 carbons.

The products of the invention are solid copolymers which have as recurring units (a) peroxy groups, that is, groups with the structure —O—O—, and (b) tetrafluoroalkenylene groups of four carbon atoms, that is, groups containing one olefinic bond in which the carbons in the 1 and 4 positions are hydrogen-free and are each joined to two fluorine atoms, one of the carbons in the 2 and 3 positions is bonded to hydrogen, and the other of the carbons in the 2 and 3 positions is bonded to hydrogen, a halogen, a carboxyl group or group hydrolyzable thereto, or an aliphatically saturated hydrocarbon or halohydrocarbon group, preferably of 1 to 8 carbon atoms, in which the halogen has an atomic number of 9–35, inclusive. Illustrative of groups hydrolyzable to carboxyl are esters (—COOR), amides (—CONH$_2$, —CONHR', —CONR$_2$—), acid halides (—COX) and cyano (—CN). In these groups R and R' are preferably aliphatically saturated hydrocarbon or halohydrocarbon groups of up to 8 carbon atoms. Compounds with groups of these chain lengths are preferred solely because of ease of handling and availability.

The group defined in (b) in the above paragraph is referred to hereinafter as the tetrafluoroalkenylene group.

The manner in which the peroxy groups and the tetrafluoroalkenylene groups are bonded to each other is not a critical feature of the copolymer. The bondings occur between the two free valences of the peroxy group (—O—O—) and the free valences on carbons of two tetrafluoroalkenylene units, that is, the valences not used in bonding the carbons to the groups previously described or in formation of the olefinic bond are used to form the copolymer. The properties of the copolymers, which are described in subsequent paragraphs, are not dependent on the location of the bonds between the peroxy group and the carbons on the two tetrafluoroalkenylene units.

The following structural formulas illustrate two ways in which the peroxy group can be bonded to the tetrafluoroalkenylene groups:

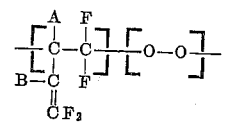

and

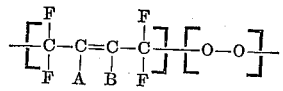

In these formulas one of A and B is hydrogen, and the other is hydrogen, a halogen, a carboxyl group or group hydrolyzable thereto, or an aliphatically saturated hydrocarbon or halohydrocarbon group, preferably of 1 to 8 carbons, inclusive, in which the halogen has an atomic number of 9 to 35 inclusive, that is fluorine, chlorine and bromine. The above structural formulas are illustrative only of the types of bondings which can occur between the peroxy groups and the tetrafluoroalkenylene groups and are not illustrative of the molar ratios of the recurring groups which are present in the solid copolymer.

The molar ratio of peroxy groups to tetrafluoroalkenylene groups is not fixed and can vary over a wide range. In the preferred group of copolymers the molar ratio of peroxy groups to tetrafluoroalkenylene groups lies between about 0.1 and about 1, that is, the mole percent of peroxy groups in the preferred solid copolymers lies between about 10% and about 50%.

The copolymers of the invention are prepared by contacting a 1,1,4,4-tetrafluoro-1,3-butadiene of the formula

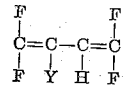

where Y is hydrogen, a halogen, carboxyl or group hydrolyzable thereto, or a hydrocarbon or halohydrocarbon group, preferably of 1 to 8 carbons in which the halogen has an atomic number of 9 to 35, inclusive, with at least 10 mole percent of oxygen, at a temperature in the range of —40 to 30° C.

The substituent Y, shown in the above formula for the tetrafluorobutadienes, does not enter into the reaction; that is, it does not take part in copolymer formation.

The nature of Y, therefore, is not a critical factor with respect to operability of the process. The substituents in the copolymer, which are the same as Y in the tetrafluorobutadienes, are also not a critical feature of the products of the invention. The group of substituents given in the definition of the product are preferred solely because of availability and ease of preparation of the tetrafluorobutadiene reactants.

The reaction is conveniently carried out by charging a reaction vessel capable of withstanding pressure with a tetrafluorobutadiene of the formula described above and oxygen. The molar ratio of oxygen to the tetrafluorobutadiene is at least 1:10, that is, oxygen is used in an amount equal to at least 10 mole percent of the tetrafluorobutadiene. If desired, the reaction mixture can be pressured with an inert gas, e.g., nitrogen, to the pressure under which the copolymerization is to be carried out. However, pressuring with an inert gas is not an essential or critical feature of the operation. Excessively high pressures are not required to effect copolymerization. In fact the reaction can be conducted at atmospheric pressure or only slightly higher than atmospheric if suitable provision is made to keep the oxygen and tetrafluorobutadiene in intimate contact. Pressures ranging from about 10 lbs./sq. in. to about 2500 lbs./sq. in. are generally suitable although, if desired, lower or higher pressures can be used.

The temperature of the reaction mixture during copolymerization preferably lies between about −40° C. and +30° C. Temperatures of 20 to 30° C. are especially preferred. Copolymers prepared within the temperature limits of −40° C. to +30° C. can be isolated readily and are stable under ordinary conditions. Copolymers prepared by reacting a tetrafluorobutadiene and oxygen at a temperature below about −40° C. tend to explode on warming to ordinary atmospheric temperatures (about 25° C.) while copolymers prepared at a temperature above about 30° C. tend to explode shortly after formation. The reasons for the differences in stability of copolymers prepared at these widely different temperatures is not clearly understood but it is believed that the differences are related to the manner in which the peroxy groups are bonded initially to the tetrafluoroalkenylene groups.

The polymerization is generally completed in a period of about two hours, as indicated by substantial cessation of oxygen absorption after this period. Reaction periods up to 16 to 24 hours are often employed to insure complete polymerization. At the completion of the polymerization the reaction vessel is vented to remove volatile materials and the solid copolymer of the tetrafluorobutadiene and oxygen is removed.

The copolymers obtained under the usual reaction conditions wherein excess oxygen is employed at a temperature of 20–30° C. and 10–2500 lb./sq. in. oxygen pressure are substantially 1:1 copolymers, i.e., copolymers containing 50 mole percent oxygen. However, when an excess of tetrafluorobutadiene is employed in the reaction, the copolymers which are obtained contain less than 50 mole percent oxygen. Thus, for copolymers containing less than 50 mole percent oxygen, the mole ratios in which the tetrafluorobutadiene and oxygen are found in the copolymer can be controlled by changing the mole ratios of the reactants. When the mole ratio of the tetrafluorobutadiene to oxygen employed is more than 1:1, the process is preferably conducted under superatmospheric pressure to assure completion of the reaction. Copolymers containing less than 50 mole percent of oxygen can also be conveniently prepared by heating a mixture of a tetrafluorobutadiene with the 1:1 copolymer of a tetrafluorobutadiene and oxygen, in the proportions necessary to give the desired oxygen content in the final copolymer, at a temperature of 30–100° C. and under a pressure of 1500–45,000 lb./sq. in. This procedure permits the preparation of mixed tetrafluorobutadiene/oxygen copolymers by heating a 1:1 copolymer of a tetrafluorobutadiene and oxygen with a tetrafluorobutadiene of different composition than the initial reactant. Such mixed copolymers are also prepared directly by reacting mixtures of two or more tetrafluorobutadienes and oxygen.

The 1,1,4,4-tetrafluoro-1,3-butadienes used in the process of this invention can be prepared by pyrolysis at a temperature within the range of 350–900° C. of a tetrafluorocyclobutene having two fluorine atoms on each of the saturated annular carbons, one of the unsaturated annular carbons being bonded to H, and the other being bonded to Y, where Y is as defined above. The particular pyrolysis temperature required for best results in any case is dependent on the particular substituents on the unsaturated carbons of the tetrafluorocyclobutene. Pressure is not critical in this pyrolysis reaction. However, it is preferred to operate at pressures of less than 50 mm. of mercury. This process is described in greater detail in U.S. Patent 2,754,323 and in U.S. application Serial No. 710,046, filed February 1, 1958 by J. L. Anderson and K. L. Berry. Oxygen of the grade available commercially is satisfactory for use in the process of the invention. Liquid or gaseous oxygen can be employed.

The copolymers of this invention and their preparation are illustrated in further detail in the following examples in which proportions of ingredients are expressed in parts by weight unless otherwise noted.

EXAMPLE I

A stainless steel shaker tube of about 80 parts water capacity, cooled to −50° C., is charged with 7 parts of 1,1,4,4-tetrafluoro-1,3-butadiene, and oxygen is added to a total pressure of 2410 lb./sq. in. in the tube. The tube is then shaken for 16 hours at room temperature (about 30° C.). At the end of this period the tube is vented to release excess oxygen and any unpolymerized tetrafluorobutadiene. There is obtained 7 parts of white solid polymer as a tough film of the walls of the shaker tube. This polymer is soluble in acetone; it explodes violently when heated to 122° C. and it readily liberates iodine from potassium iodide in aqueous acetone. Elemental analysis and chemical reactivity show this polymer to be a 1:1 copolymer of 1,1,4,4-tetrafluoro-1,3-butadiene and oxygen of predominantly peroxidic structure.

*Analysis.*—Calc'd for $C_4F_4H_2O_2$: C, 30.4%; H, 1.3%; F, 48.1. Found: C, 30.5%; H, 1.6%; F, 48.4%.

EXAMPLE II

A stainless steel shaker tube of about 80 parts water capacity is charged with 4.5 parts of 1,1,4,4-tetrafluoro-1,3-butadiene and is then pressured to 495 lb./sq. in. with oxygen. The closed tube is then shaken at 28° C. for a period of 16 hours. After the tube is opened there is obtained 5 parts of a white polymer as a tough film on the walls of the tube. This polymer is soluble in acetone. A sample of the polymer is dissolved in acetone and acetic acid, and is digested with hydrogen iodide. The liberated iodine is then titrated with standard sodium thiosulfate solution. The results of this treatment indicate that the polymer contains 1.1 moles of peroxide per mole of diene. The high peroxide content indicates that the polymer is crosslinked to some extent by peroxide bridges.

EXAMPLE III

A stainless steel shaker tube of about 80 parts water capacity is charged with 5 parts of 1,1,4,4-tetrafluoro-1,3-butadiene and the tube is then pressured to 525 lb./sq. in. with oxygen. The closed tube is shaken at 30° C. for 16 hours and then vented to release volatile material. There is obtained 5 parts of a white polymer as a tough film on the walls of the tube. An infrared absorption spectrum of this polymer shows that it consists of a large predominance of units formed by 1,2-addition of oxygen to the diene. The presence of some 1,4-addition units is also indicated.

EXAMPLE IV

A stainless steel shaker tube of about 80 parts water capacity is charged with 5 parts of 1,1,4,4-tetrafluoro-1,3-butadiene and is then pressured to 190 lb./sq. in. with oxygen. The closed tube is shaken at 30° C. for 16 hours, after which the tube is vented to relieve pressure. There is obtained 4.1 parts of solid polymer of two distinct types. Both types are soluble in acetone. One type of copolymer is identical in all respects with the polymer formed at higher pressures, i.e., at 500–2500 lb./sq. in. The second type of polymer is quite rubbery. The infrared absorption spectra of both polymers show them to be of the same structure as samples obtained at higher pressures.

EXAMPLE V

A flexible platinum tube is charged with one part of the 1,1,4,4-tetrafluoro-1,3-butadiene/oxygen copolymer of Example II and 4 parts of 1,1,4,4-tetrafluoro-1,3-butadiene and the tube is sealed. The sealed tube is placed in a vessel capable of withstanding high pressure, the outer vessel is closed and the reaction tube is maintained at a temperature of 60° C. under a pressure of 3000 atmospheres of helium for 16 hours, then at 100° C. under 2900 atmospheres of helium for 16 hours. At the end of this time the reaction tube is removed, and there is obtained 4.82 parts of a solid polymer. On analysis, this product is found to contain 36.11% C, 1.78% H, and 54.30% F. These values correspond to a copolymer of oxygen and 1,1,4,4-tetrafluoro-1,3-butadiene containing 25 mole percent oxygen.

The copolymers of this invention have been illustrated in the examples by specific reference to copolymers of 1,1,4,4-tetrafluoro-1,3-butadiene. However, this invention includes copolymers of other tetrafluoro-1,3-butadienes having the formula given previously with up to 50 mole percent oxygen. Thus, by using the process of Example I, solid copolymers containing about 50 mole percent oxygen are prepared from oxygen and 2-chloro-1,1,4,4-tetrafluoro-1,3-butadiene, 1,1,2,4,4-pentafluoro-1,3-butadiene, 2-methyl-1,1,4,4-tetrafluoro-1,3-butadiene, 2-butyl-1,1,4,4-tetrafluoro-1,3-butadiene, 2-hexyl-1,1,4,4-tetrafluoro-1,3-butadiene, 2-dodecyl-1,1,4,4-tetrafluoro-1,3-butadiene, 2-perfluoropropyl-1,1,4,4-tetrafluoro-1,3-butadiene 2-(3-chloropropyl)-1,1,4,4-tetrafluoro-1,3-butadiene, 2-phenyl-1,1,4,4-tetrafluoro-1,3-butadiene, 2-(p-chlorophenyl)-1,1,4,4-tetrafluoro-1,3-butadiene, 2-(α-naphthyl)-1,1,4,4-tetrafluoro-1,3-butadiene, 2-cyclohexyl-1,1,4,4-tetrafluoro-1,3-butadiene, 2-carboxy-1,1,4,4-tetrafluoro-1,3-butadiene, 2-methoxycarbonyl-1,1,4,4-tetrafluoro-1,3-butadiene, 2-ethoxycarbonyl-1,1,4,4-tetrafluoro-1,3-butadiene, 2-heptafluorobutyloxycarbonyl-1,1,4,4-tetrafluoro-1,3-butadiene, 2-carbamoyl-1,1,4,4-tetrafluoro-1,3-butadiene, 2-(N,N-diethylcarbamoyl)-1,1,4,4-tetrafluoro-1,3-butadiene, 2-(N-butylcarbamoyl)-1,1,4,4-tetrafluoro-1,3-butadiene, 2-chloroformyl-1,1,4,4-tetrafluoro-1,3-butadiene, 2-fluoroformyl-1,1,4,4-tetrafluoro-1,3-butadiene or 2-cyano-1,1,4,4-tetrafluoro-1,3-butadiene.

Copolymers which have a wide range of oxygen content can be prepared by varying the quantity of the tetrafluorobutadiene employed in the process of Example V. To illustrate, a copolymer containing about 10 mole percent of oxygen is obtained by heating 1 part of the 1,1,4,4-tetrafluoro-1,3-butadiene/oxygen copolymer of Example II and 10 parts of 1,1,4,4-tetrafluoro-1,3-butadiene. A copolymer which contains about 35 mole percent of oxygen can be obtained by heating 5 parts of the 1,1,4,4-tetrafluoro-1,3-butadiene/oxygen copolymer of Example II and 10 parts of 1,1,4,4-tetrafluoro-1,3-butadiene as described in Example V. When 2 parts of the copolymer of 2-ethoxycarbonyl-1,1,4,4-tetrafluoro-1,3-butadiene and oxygen, prepared by the method described in Example II, is heated with 4 parts of 2-ethoxycarbonyl-1,1,4,4-tetrafluorobutadiene, a product containing about 20 mole percent of oxygen is obtained. When 1 part of the copolymer of 2-cyano-1,1,4,4-tetrafluoro-1,3-butadiene and oxygen prepared by the method described in Example II, is heated with about 4 parts of 2-cyano-1,1,4,4-tetrafluoro-1,3-butadiene as described in Example V, a copolymer containing about 25 mole percent of oxygen is obtained.

It is essential in the preparation of the initial solid copolymers from the tetrafluorobutadienes and oxygen that at least 10 mole percent of oxygen be used. If less than 10 mole percent is employed, a homopolymer of the tetrafluorobutadiene is obtained and there is no evidence of copolymer formation between the tetrafluorobutadiene and oxygen. The effect of using less than 10 mole percent of oxygen in the process of the reaction is illustrated as follows:

*a.* A small glass tube (A) (8 mm. x 10 cm.) is charged with about 0.5 part of liquid 1,1,4,4-tetrafluoro-1,3-butadiene at −78° C. The tube is evacuated and sealed. A second tube (B) (8 mm. x 10 cm.) is cooled to −78° C., charged with about 0.5 part of liquid 1,1,4,4-tetrafluoro-1,3-butadiene, evacuated, pressured to 30 mm. with oxygen (equal to 3 mole percent) and sealed. The tubes are maintained at 34° C. for 35 days. Tube B then contains a fair but undetermined amount of a homopolymer of 1,1,4,4-tetrafluoro-1,3-butadiene; tube A contains no polymer.

The experiment demonstrates that no polymer is formed in the absence of oxygen and only the homopolymer is formed when 3 mole percent of oxygen is present.

*b.* A platinum tube ¼" in diameter and 6" long is sealed at one end, cooled to −78° C., charged with 2.67 parts of 1,1,4,4-tetrafluoro-1,3-butadiene and the other end sealed in air. The volume of air present is equivalent to about 0.2 mole percent of oxygen. The tube is heated to 100° C. under an externally applied pressure of 2800 atmospheres for 16 hours. The yield of polymer is 2.48 parts (93%). The polymer has a melting point of 266° C., is insoluble in all solvents and can be pressed to a clear, tough film at 360° C./20,000 lbs. It does not explode on heating and does not support combustion. It has in all respects the characteristics of the homopolymer.

*c.* A stainless steel, high pressure bomb (capacity, 200 parts of water) is cooled to −78° C., evacuated and charged with 13 g. of 1,1,4,4-tetrafluoro-1,3-butadiene. Air is added to a pressure of 1 atmosphere (2.5 mole percent of oxygen based on 1,1,4,4-tetrafluoro-1,3-butadiene). The tube is pressured to 2500 atmospheres with distilled water and is heated 16 hours at 90° C. There is obtained 6.77 parts (56%) of gray polymer. The polymer is boiled with 50% nitric acid to decolorize it. No degradation takes place. It can be pressed to a clear film at 360° C./20,000 lbs. pressure. Such film has tensile strengths of about 8000 lb./sq. in. at 35% elongation. The tensile modulus is 180,000 lb./sq. in. The polymer is in all ways identical to homopolymers prepared using such catalysts as benzoyl peroxide and azobisisobutyronitrile.

The tetrafluorobutadiene/oxygen copolymers of this invention are rubbery solid products which are usually white or gray in color. They contain peroxy groups as shown by the fact that aqueous potassium iodide solutions in contact with the copolymers release iodine. They can be stored at normal atmospheric pressures and temperatures but must be kept away from open flames since the copolymers are flammable. The copolymers are soluble in oxygenated organic solvents, for example, acetone. The copolymers explode forcefully when heated to 125° C. or when subjected to sudden shock. When ignited, the products burn with explosive force. Because of the explosive properties of the copolymers under conditions which can be controlled, the copolymers are generically useful as solid rocket fuels. Their usefulness in the fields of rocket propellants is illustrated as follows:

Example A

A rocket head, made of aluminum metal, is packed loosely with strips cut from a 1,1,4,4-tetrafluoro-1,3-butadiene/oxygen copolymer film prepared as described in Example II (now effectually serving as propellant powder grains). The rocket head is placed on an inclined plane with the open end of the head at the low end of the plane. An open flame is touched to the open end of the head from which a small quantity of copolymer protrudes. The copolymer ignites immediately and the rocket is propelled a substantial distance from the inclined plane. There is no detonation and no residual solid material is present in the recovered rocket.

Example B

A rocket head, made of aluminum, is attached to a rocket stick. The rocket head is loosely packed with the copolymer of 1,1,4,4-tetrafluoro-1,3-butadiene and oxygen, prepared as described in Example II, in such a manner that short strips of polymer protrude from the open end of the rocket head. The ratio of the weight of the copolymer to the weight of the rocket is 1 to 1.75. The protruding portion of the copolymer is wet with acetone and then ignited with an open flame. The rocket is propelled a substantial distance over an arc-shaped path of travel. The copolymer burns without detonation and leaves no solid residual products.

Example C

A rocket head, made of copper, is charged as described in Example A with the copolymer of 1,1,4,4-tetrafluoro-1,3-butadiene and oxygen prepared as described in Example II and mounted on an inclined plane. The ratio of the weight of the copolymer to the weight of the rocket head is about 1:14.3. Very short lengths of strips of copolymer protrude from the open end of the rocket head. The protruding portion of the copolymer is wet with benzene and ignited with an open flame. The rocket is propelled over a substantial distance. The rocket, which is recovered soon after flight, is cool and contains no solid residual matter.

Rocket flights over much longer distances are achieved by employing rocket heads which are designed to prevent dissipation of the propelling effect of the burning copolymer from the open end of the rocket head, that is, rockets which will utilize the propelling effect of the burning copolymer most efficiently.

From the above illustrations it is seen that the copolymers of the present invention are advantageously employed as rocket fuels because the copolymers (a) are solids which can be stored easily under normal conditions of temperature and pressure, (b) can be subjected to mechanical operations, for example, cutting or slicing into small sections, (c) burn readily without detonation and with high propelling power, and (d) leave no undesirable solid residues. The copolymers can be employed alone or in admixture with other materials employed as solid rocket fuels. For example, the copolymers of the invention can be used in mixtures which contain asphalt, carbon black, sulfur-containing organic polymers, inorganic perchlorates, inorganic peroxides and the like.

For use as rocket fuels the copolymers of this invention can be prepared in situ, that is, by reacting the tetrafluorobutadiene and oxygen (preferably as liquid oxygen) in a suitable chamber in the rocket. Under these conditions it is not essential to maintain the preferred temperature limits of $-40$ to $+30°$ C. disclosed earlier in the description of the process, since the copolymers are used directly as propellants without preliminary isolation or purification. The temperature for copolymerization of the tetrafluorobutadiene and oxygen will be selected in relation to conditions under which the rocket is to be fired.

The tetrafluorobutadiene/oxygen copolymers of this invention are generically useful as addition polymerization catalysts. In this field of utility they are capable of producing polymers of high inherent viscosity. This is illustrated as follows:

Example D

A glass reaction vessel capable of withstanding pressure is charged with 25 parts of t-butyl alcohol, 10 parts of acrylonitrile and 0.5 part of a 1:1 copolymer of 1,1,4,4-tetrafluoro-1,3-butadiene and oxygen. The reaction vessel is then flushed well with nitrogen, and the closed vessel is heated at 95° C. for 24 hours. There is obtained a 3-part yield of polyacrylonitrile. This polyacrylonitrile has an inherent viscosity in dimethylformamide of 2.40. In comparison, a similar polymer obtained using a typical azo catalyst, azodiisobutyronitrile, in t-butyl alcohol has an inherent viscosity of 1.79.

Polymers of this invention are also useful as explosives. While these copolymers are stable at ordinary temperatures, they can be exploded violently by heating to about 125° C. and by subjecting them to shock.

Films can be prepared from acetone solutions of the tetrafluorobutadiene/oxygen copolymers of this invention, and solutions of the copolymers can be used as coating compositions.

From the foregoing description it can be seen that the invention provides useful fluorine-bearing copolymers of unusual and unexpected properties by a relatively simple process.

Since obvious modifications in our invention will be evident to those skilled in the chemical arts, we propose to be bound solely by the appended claims.

The embodiments of the invention in which an exclusive property or privilege is claimed are defined as follows:

1. A copolymer of (1) a 1,1,4,4-tetrafluoro-1,3-butadiene having at least one hydrogen attached to one of the 2 and 3 carbons and (2) oxygen, said copolymer containing recurrent peroxide (—O—O—) linkages.
2. The copolymer of claim 1 containing about 10 mole percent oxygen.
3. The copolymer of claim 1 containing about 50 mole percent oxygen.
4. A copolymer of (1) 1,1,4,4-tetrafluoro-1,3-butadiene and (2) oxygen, said copolymer containing recurrent peroxide (—O—O—) linkages.
5. The process which comprises contacting a 1,1,4,4-tetrafluoro-1,3-butadiene having at least one hydrogen attached to one of the 2 and 3 carbons with at least 10 mole percent of oxygen and thereby forming a copolymer having recurrent peroxide (—O—O—) linkages.
6. The process of claim 5 in which the oxygen:tetrafluorobutadiene mole ratio is about 1:1.
7. A solid grain of propellant powder formed from a copolymer of claim 1.
8. A solid grain of propellant powder formed from a copolymer of (1) 1,1,4,4-tetrafluoro-1,3-butadiene and (2) oxygen, said copolymer containing recurrent peroxide (—O—O—) linkages.
9. The product of claim 1 in the form of a tough film.
10. The product of claim 4 in the form of a tough film.

References Cited in the file of this patent

UNITED STATES PATENTS

| | | |
|---|---|---|
| 2,604,688 | Miller et al. | July 29, 1952 |
| 2,691,646 | Young | Oct. 12, 1954 |
| 2,712,726 | Fox | July 12, 1955 |
| 2,810,257 | Carmody | Oct. 22, 1957 |

OTHER REFERENCES

Noland: "Chemical Eng.," 65, pp. 145–160, May 20, 1958. (Copy in Scientific Library.)